Dec. 11, 1928.
M. H. KOTZEBUE
1,695,192
VAPOR EXTRACTOR
Filed May 28, 1927
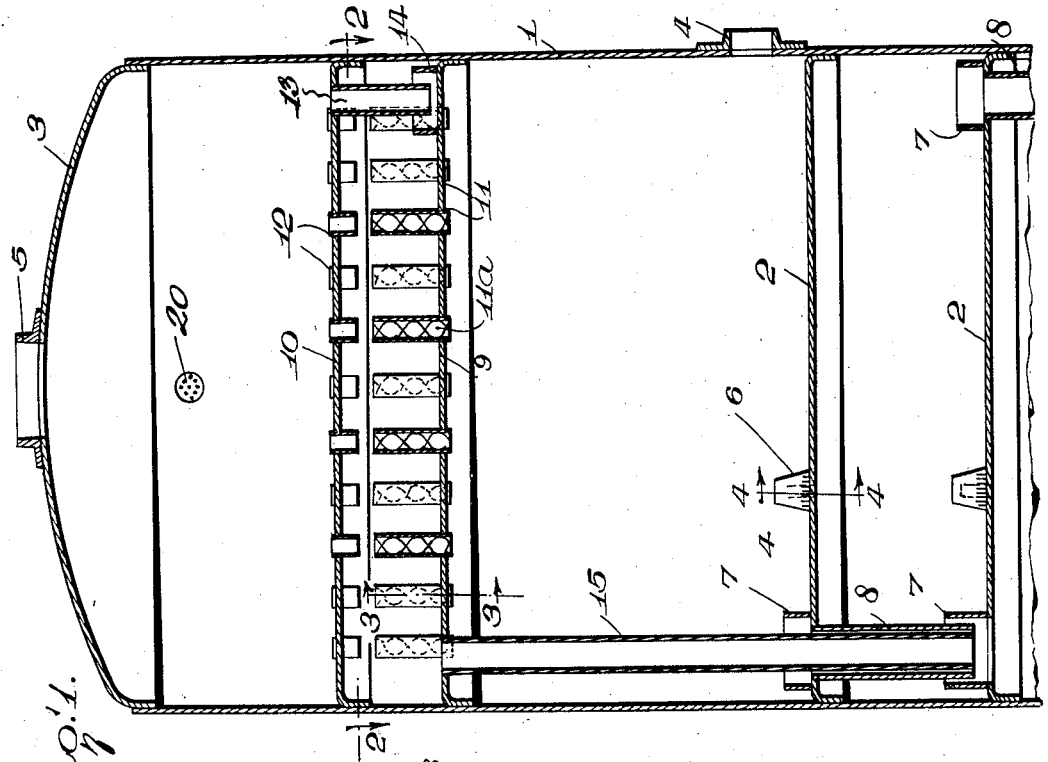
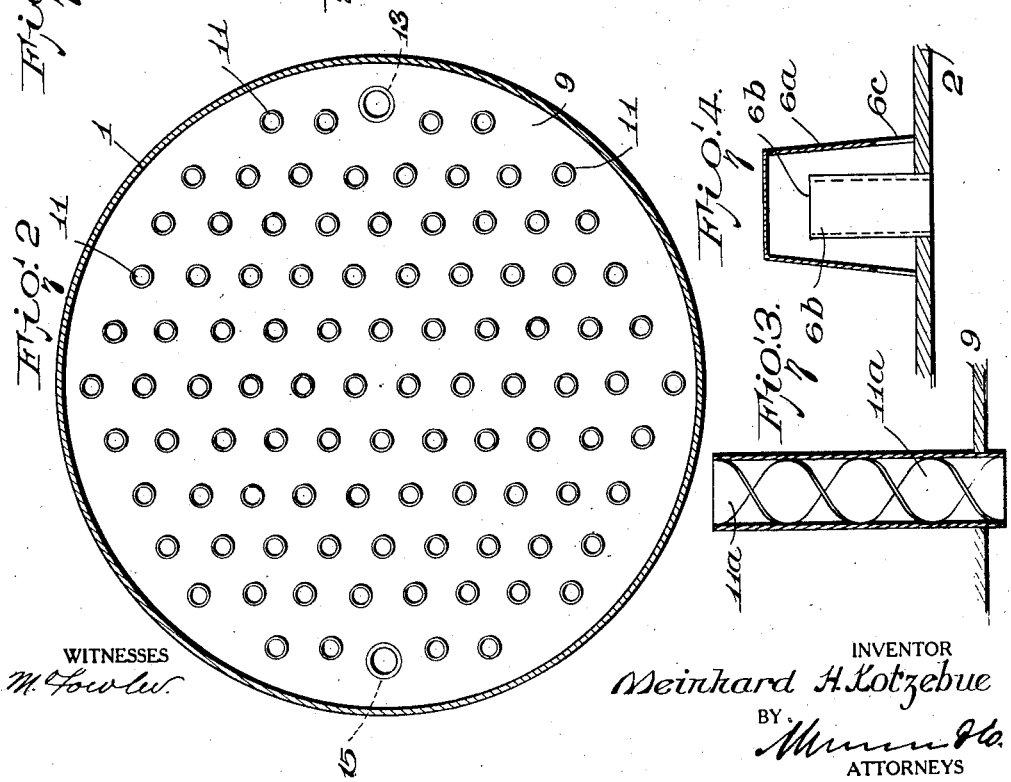
WITNESSES
M. Fowler
INVENTOR
Meinhard H. Kotzebue
BY
ATTORNEYS Patented Dec. 11, 1928.

1,695,192

UNITED STATES PATENT OFFICE.

MEINHARD HENRY KOTZEBUE, OF TULSA, OKLAHOMA.

VAPOR EXTRACTOR.

Application filed May 28, 1927. Serial No. 194,964.

This invention relates to a device to be applied upon towers used for the extraction of gases from liquids and the distillation of liquids and has for its object the provision of means for separating entrained particles of liquid from the gases leaving the top of such a tower.

The invention resides in the arrangement in combination of parts used to make such an extractor, and its combination with a tower of the class described. Its use is not confined to towers by the specific means for extraction of the entrained particles or mist, and may be used in any apparatus where applicable.

Referring now to the drawings:—

Figure 1 illustrates a vertical section of the top of a tower and shows the device applied thereto, Figure 2 shows a plan view in section of a tower such as shown in Figure 1, the said view being taken on a line corresponding to the line 2—2 on Figure 1, Figure 3 indicates a sectional view in side elevation taken on the line 3—3 of Figure 1 and shows a means for imparting a whirling motion to the gases which pass up through the tower, and Figure 4 shows a cross section in side elevation of a bubble unit taken on the line 4—4 of Figure 1.

Referring now again to Figure 1 numeral 1 indicates the shell of the tower, said shell having therein at intervals a plurality of trays 2. The top of the tower is closed by a dome-shaped head 3. On one side of the tower there is a pipe section 20 provided for the entrance of a stream of oil which may be used to absorb certain gases from the gas supply introduced in the bottom of the tower and which is allowed to force its way up through layers of oil carried on the trays up through the last exit and out the passageway 5 on the top of the tower. While the tower now described is maintained primarily for the absorption of gasoline vapors from natural gases, bearing such vapors and the distillation of gasoline from heavier hydro-carbons containing such vapors, it is to be understood that this tower may be applied in general to the absorption of gases from gases and the distillation of gases and vapors from liquids.

Upon the trays is a plurality of bubbling units 6 which are of the conventional type, that is they consist of an inter-tube penetrating the tray and a cap over said tube, the bottom of the said cap being slotted in order to allow the escape of gas through the liquid lying on top of the tray. Each tray bears also, over-flow cups 7 and tubes 8 which are of the conventional type. The two upper trays 9 and 10 with their associated tubes in gas spaces are what constitute the mist extractor of the present invention. The tray 9 is provided with a multiplicity of tubes 11 which extend through the tray surfaces and are held fast therein, and extend vertically upwardly therefrom for a substantial distance. Inside of each of these tubes there is held, by any suitable means, but preferably by a driving fit, a strip of twisted flat metal 11ª. The twist of this metal is such as to give the gases passing upwardly through the tube an outwardly whirling path, thereby imparting a centrifugal motion to the liquid droplets carried in such a gas current. In the tray 10 there are an according number of tubes 12 likewise extending through the tray, but in this case having a clear bore and having the greater length of the tube extending below the surface of the tray instead of above it. The openings made by the tubes 12 preferably register with the openings made by the tubes 11. Between the upper ends of tubes 11 and the lower ends of tubes 12 there is a substantial space which is adapted to enable the whirling droplets of the gas current to be deposited between the trays 9 and 10; should such deposition be incomplete a further deposition will accrue in the larger space between the tray 10 and the dome shaped head 3. The deposition of droplets, which in the case of the cleaning of natural gas would consist of water and oil, will gradually build up a liquid level on each of the trays 9 and 10. To allow the refluxing of this liquid pack to the lower portion of the tower there is provided a drain pipe 13 in the tray 10, a liquid seal cup 14 surrounding the lower portion of such pipe on tray 9 and a longer drain pipe 15 on the opposite side of tray 9 extending completely through the top tray 2 down into the liquid seal cup 7 of the next lower tray 2.

In operation the gas current to be cleaned bubbles up through the oil level carried on the trays 2 by means of the bubble units 6, passes through these up through the bubble unit directly above the first one. The oil as it overflows into the overflow cup 7 flows down to the next lower tray and establishes its level there before flowing down into the next lower one, hence, when the ascending gas current is constrained to pass through the tubes 11 it takes a spiral path by reason of the persistence of the spiral strip 11ª. After passing through the tubes 11 the gas current loses a great part of its upward velocity by reason of its encountering a dead space and therefore deposits the droplets by whirling them clear of the tubes. The gas particles themselves being lighter than the liquid particles are not whirled to such a distance, so that the greater part of them pass through the tubes 12 at a considerably decreased velocity. The space above the tray 10 allows a temporary stagnation and gives them a further chance to deposit entrained liquid. After such period of comparative stagnation the clean gas passes up and out the exit connection 5.

While I have herein described one embodiment of the invention it is evident that changes may be made therein without departing from the spirit of the invention and all such modifications I claim as my own if they fairly fall within the scope of the appended claim.

I claim:

A tower for the absorption of fluids comprising a shell having gas and liquid entrance and discharge passages, spaced trays in the shell, bubbling units carried by certain of the trays, a pair of the trays being closely associated with each other, one of the pair of trays having passages therethrough, pipes rising from the passages, means in the pipes for causing the whirling movement of gases passing therethrough, the other of the pair of trays having passages with pipe connections mounted in the passages and having one end spaced from adjacent pipes in the other tray, the portion of the shell between the spaced ends of the pipes constituting a dead space where the gas passing through the whirling means loses some of its velocity.

MEINHARD HENRY KOTZEBUE.